(12) United States Patent
Weirich

(10) Patent No.: US 9,726,215 B2
(45) Date of Patent: Aug. 8, 2017

(54) FORCE TRANSMISSION UNIT

(71) Applicant: CASAR Drahtseilwerk Saar GmbH, Kirkel (DE)

(72) Inventor: Johannes Weirich, Saarbrücken (DE)

(73) Assignee: CASAR DRAHTSEILWERK SAAR GMBH, Kirkel (DE)

( * ) Notice: Subject to any disclaimer, the term of this patent is extended or adjusted under 35 U.S.C. 154(b) by 351 days.

(21) Appl. No.: 14/395,968

(22) PCT Filed: Apr. 23, 2013

(86) PCT No.: PCT/DE2013/100148
§ 371 (c)(1),
(2) Date: Oct. 21, 2014

(87) PCT Pub. No.: WO2013/159771
PCT Pub. Date: Oct. 31, 2013

(65) Prior Publication Data
US 2015/0122067 A1 May 7, 2015

(30) Foreign Application Priority Data

Apr. 23, 2012 (DE) .................. 10 2012 103 540

(51) Int. Cl.
*F16G 11/02* (2006.01)
*F16C 1/14* (2006.01)
*B21J 5/06* (2006.01)

(52) U.S. Cl.
CPC ................ *F16C 1/145* (2013.01); *B21J 5/06* (2013.01); *F16G 11/02* (2013.01); *Y10T 29/49925* (2015.01); *Y10T 74/20* (2015.01)

(58) Field of Classification Search
CPC ........ F16G 11/02; F16G 11/025; Y10T 24/49; Y10T 24/398; Y10T 403/49; Y10T 29/49925; Y10T 29/49927; Y10T 29/49934; Y10T 29/53987; Y10T 29/53996; F16C 1/145; D07B 9/00; B21D 53/58
See application file for complete search history.

(56) References Cited

U.S. PATENT DOCUMENTS 133,290 A * 11/1872 Badcock ................... F16B 5/04
279/28
1,573,737 A * 2/1926 Norman ................... D07B 9/00
24/115 R
(Continued)

FOREIGN PATENT DOCUMENTS

CH 631 837 * 8/1982
DE 1200614 B 9/1965
(Continued)

*Primary Examiner* — Robert Canfield
(74) *Attorney, Agent, or Firm* — Lucas & Mercanti, LLP; Klaus P. Stoffel

(57) ABSTRACT

A force transmission unit that has a rope, particularly a wire rope, and a device for introducing a force into the rope, that includes a sleeve enclosing the rope and connected to the rope under deformation. The force transmission unit has a connecting member which is arranged between the sleeve and the rope and formed from a material that has a lower strength than the materials from which the sleeve and the outer strands of the rope are formed and which preferably has a hollow cylindrical shape.

16 Claims, 3 Drawing Sheets

(56) References Cited

U.S. PATENT DOCUMENTS

| | | | | |
|---|---|---|---|---|
| 1,643,110 | A * | 9/1927 | Briggs | F16G 11/02 16/DIG. 41 |
| 1,910,269 | A * | 5/1933 | Sunderland | F16G 11/02 29/517 |
| 2,025,556 | A | 12/1935 | Stahl | |
| 2,060,864 | A * | 11/1936 | Hedler | F16G 11/04 140/111 |
| 2,199,892 | A * | 5/1940 | Metcalf | F16G 9/00 16/108 |
| 2,564,463 | A * | 8/1951 | Burns | H01R 4/20 174/42 |
| 2,615,074 | A * | 10/1952 | Bronovicki | H02G 1/081 174/10 |
| 2,939,732 | A * | 6/1960 | Rochester, Jr. | F16G 11/02 403/370 |
| 3,091,829 | A * | 6/1963 | Heck | F16G 11/02 29/517 |
| 3,098,027 | A * | 7/1963 | Flower | H01R 4/184 174/90 |
| 3,471,904 | A * | 10/1969 | Aho | E21B 17/02 174/21 R |
| 3,638,975 | A * | 2/1972 | Buettner | F16G 11/02 24/114.5 |
| 3,705,445 | A * | 12/1972 | Smollinger | F16G 11/00 174/42 |
| 3,739,457 | A * | 6/1973 | Davis | B29C 39/10 174/176 |
| 3,797,947 | A * | 3/1974 | Foote | F16G 11/02 403/212 |
| 3,844,923 | A | 10/1974 | Sandrock | |
| 3,861,811 | A * | 1/1975 | Mason | B21D 53/58 24/115 A |
| 3,909,886 | A * | 10/1975 | Hocke | H02G 1/081 174/79 |
| 4,095,328 | A * | 6/1978 | Cawthorne | B23P 11/00 29/515 |
| 4,097,164 | A * | 6/1978 | Campbell | F16G 11/02 24/115 A |
| 4,338,833 | A * | 7/1982 | Schleffendorf | B25G 1/01 29/447 |
| 4,413,386 | A * | 11/1983 | Sato | F16G 11/00 24/129 W |
| 2002/0172547 | A1* | 11/2002 | Hong | F16G 11/02 403/278 |
| 2012/0141198 | A1* | 6/2012 | Kondo | F16G 11/02 403/361 |
| 2013/0047572 | A1* | 2/2013 | Morgan | B21D 39/04 57/200 |
| 2015/0354666 | A1* | 12/2015 | Weirich | F16G 11/02 24/115 A |

FOREIGN PATENT DOCUMENTS

| | | | |
|---|---|---|---|
| DE | 2230276 A1 | 1/1973 | |
| DE | 202012012547 U1 * | 5/2013 | F16G 11/025 |
| FR | 1280990 A | 1/1962 | |
| GB | 238173 A | 1/1926 | |
| GB | 1044465 A * | 9/1966 | H01R 4/26 |
| WO | 2011103640 A1 | 9/2011 | |

* cited by examiner

FORCE TRANSMISSION UNIT

The present application is a 371 of International application PCT/DE2013/100148, filed Apr. 23, 2013, which claims priority of DE 10 2012 103 540.7, filed Apr. 23, 2012, the priority of these applications is hereby claimed and these applications are incorporated herein by reference.

BACKGROUND OF THE INVENTION

The invention pertains to a force transmission unit comprising a rope, especially a wire rope, and a device for introducing a force into the rope comprising a sleeve, which surrounds the rope and is connected to the rope under deformation. The invention also pertains to a method for producing the force transmission unit.

Such force transmission units are known from prior use. The sleeve, usually called an "end connector", serves to connect the rope to an object intended to cooperate with the rope and to transmit forces between the rope and the object. For the production of an end connector for a wire rope in particular, the sleeve, which usually consists of mild steel, is pressed directly onto the wire rope. The problem with this is that, especially in the case of wire ropes, for the production of which high-strength steel wire strands are used, there is the danger that damage can occur to the rope in the area of the end connector, leading to the breaking of the rope.

SUMMARY OF THE INVENTION

The invention is based on the goal of creating a force transmission unit of the type indicated above which is protected more effectively against such damage.

According to the invention, the goal is achieved by a connecting member arranged between the sleeve and the rope, this member consisting of a material of lower strength than the materials out of which the sleeve and the outer strands of the rope are made.

Embedding the rope in the softer material considerably reduces the danger that damage can occur to the rope upon installation of the force transmission unit or during later use of the force transmission unit as a result of the action of the forces and mechanical loads exerted on the rope by the force-introducing device. As a result, rope breakage is avoided, and the service life of the force transmission unit is prolonged.

The sleeve is advisably formed out of mild or heat-treatable steel. The connecting member, in the preferred embodiment of the invention, consists of an aluminum or copper alloy or of a low-alloy steel.

In one embodiment of the invention, at least certain sections of the sleeve and/or of the connecting member comprise a hollow cylindrical shape, wherein the connecting member is preferably surrounded by the sleeve. The shapes of the sleeve and connecting member are advisably adapted to each other in such a way that the sleeve "jackets" the connecting member preferably completely, so that the connecting member is protected externally from outside influences by the sleeve. It has been found to be especially advantageous for the force-introducing device completely jacketing the connecting member to be provided in such a way that, at least at one end, the sleeve rests by its inside surface, i.e., the surface surrounding the rope, against the lateral surface of the rope. As a result of this measure, the sleeve grips the connecting member so that a positive connection is achieved between the sleeve and the connecting member.

In an especially preferred embodiment of the invention, the wall thickness of the connecting member in a section at one end of the force transmission unit decreases at least toward one end of the force transmission unit, and the wall thickness of the sleeve increases toward the end to compensate for the decreasing wall thickness of the connecting member. This offers the advantage that a reinforced region of material is present in the sleeve in the area of the end of the force-introducing device, where strong forces can be present when the force transmission unit is subjected to load. In addition, the sleeve can be provided in such a way that, it comprises an essentially uniform outside diameter in the state in which it is gripping the connecting member.

In another embodiment of the invention, the sleeve and the connecting member, preferably the inside surface of the sleeve and the outside surface of the connecting member, interlock with each other to increase the effectiveness of the positive connection.

It is advisable for at least the sleeve to be closed at one end in order to form a cup-like shape which can accommodate the connecting member and the rope. The sleeve can also be provided with means such as an eyelet or some other connecting or coupling element for connecting the force-introducing device.

In one embodiment of the invention, the sleeve to be used to produce the force transmission unit comprises, in the as-yet-undeformed state, the shape of a hollow cylinder and is provided with a thickened wall area at least at one end. In the preferred embodiment of the invention, the thickened wall area is formed by a circumferential projection. The thickened wall area makes it possible for the force transmission unit to assume the intended shape when the sleeve and the connecting member are worked onto the rope, i.e., the shape in which the wall thickness of the sleeve increases toward the at least one end, while the wall thickness of the connecting member decreases. Although it would be conceivable that the thickened wall area could be provided on the inside surface of the sleeve or both on the outside surface and on the inside surface, in the preferred embodiment of the invention it is provided on the outside surface of the sleeve, preferably in that a collar is formed on the outside surface.

If, as provided in accordance with another embodiment of the invention, the sleeve is provided with a thickened wall area at both ends, the force transmission device is also suitable for connecting the ends of two ropes together.

To support the intended deformation, it is advisable for the connecting member to have, prior to the deformation process, a reduced wall thickness at one end, which preferably is formed by a bevel provided on the outside surface and/or the inside surface of the connecting member.

The sleeve is advisably provided on its inside surface with a tooth-like formation, preferably with a threaded structure, by means of which, as the sleeve is being mounted on the connecting member and the rope, the sleeve becomes positively connected to the connecting member. When the sleeve, made of the stronger material, is pressed, hammered, or rolled onto the connecting member, the formation is pressed into the outside wall of the softer connecting member, and the sleeve and the connecting member are interlocked.

To produce the force-introducing device, the connecting member is first placed on the rope and then pressed, hammered, and/or rolled onto the rope, so that a positive connection is achieved between the rope and the connecting member. The inside diameter of the connecting member is advisably slightly larger than the outside diameter of the rope, preferably 4-10% larger relative to the outside diameter of the rope, so that it can be placed onto the rope without a large amount of play. Then the sleeve is pushed onto the connecting member, which has already been worked onto the rope, and then pressed, hammered, and/or rolled onto the connecting member, wherein the sleeve thus becomes connected to the connecting member and the rope. For this purpose, the inside diameter of the sleeve is advisably slightly larger than the outside diameter of the connecting member, preferably 1-2% larger relative to the outside diameter of the connecting member which has been pressed, hammered, or rolled onto the rope.

Alternatively, the force-introducing device can also be produced by placing both the connecting member and the sleeve onto the rope first, before the deformation process, and then by pressing, hammering, and/or rolling them jointly onto the rope. For this purpose, the sleeve and the connecting member are adapted with respect to their dimensions both to each other and to the rope with which the force transmission unit is to be formed. As described above, the inside diameter of the connecting member is adapted to the outside diameter of the rope, so that it can be placed on the rope without much play. The sleeve comprises an inside diameter which is slightly larger than the outside diameter of the connecting member, preferably 1-4% larger relative to the outside diameter of the connecting member, so that the sleeve can be placed onto the connecting member without much play.

During the deformation process, the sleeve is deformed in such a way that, upon completion of the process, it comprises an essentially uniform outside diameter. The sleeve is deformed to a greater extent at the end where the thickened wall area is provided than it is in the rest of the sleeve. The material in the area of the thickened wall which originally projected from the outside surface is pushed radially inward and fills the space left open as a result of the decrease in the connecting member's wall thickness toward the end.

The invention is explained in greater detail below on the basis of exemplary embodiments and the attached drawings, which refer to these examples:

DETAILED DESCRIPTION OF THE INVENTION

Figure 1:
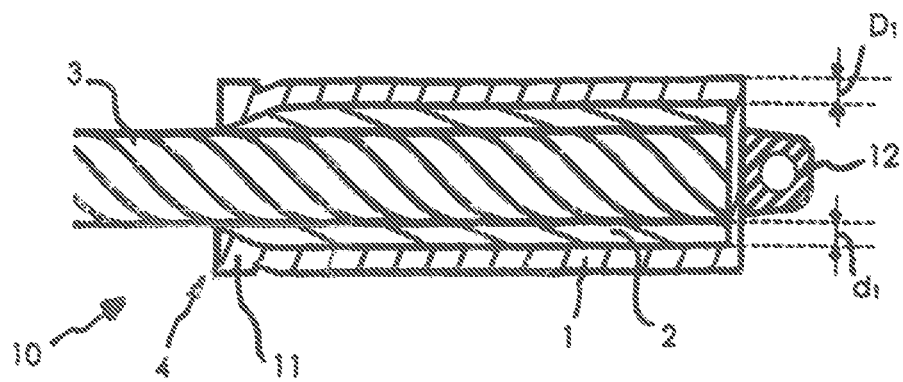
FIG. 1 shows a cross-sectional schematic diagram of a force transmission unit according to the invention.

A force transmission unit 10 according to the invention shown in FIG. 1 comprises a wire rope 3 with outside strands of steel; a connecting member 2, made of an aluminum alloy, mounted on the wire rope 3; and a sleeve 1 of mild steel, which surrounds the connecting member 2.

The connecting member 2 comprises a hollow cylindrical form and is seated in the hollow cylindrical sleeve 1, which is closed at one end and thus has a cup-like shape. It is provided at the closed end with an eyelet 12. At the end of the sleeve 1 opposite the closed end, the wall thickness $D_1$ of the sleeve increases to the same degree as the wall thickness $d_1$ of the connecting member 2 decreases, so that the inside surface of the sleeve 1 rests at one end against the wire rope and also surrounds the connecting member 2 when viewed in the axial direction, but its outside diameter is essentially uniform.

The sleeve 1 and the connecting member 2, as will be explained below, have been pressed onto the wire rope 3 and thus deformed. Between the sleeve 1 and the connecting member 2, a positive connection is produced by means of the gripping effect produced at the end 4 of the sleeve 1 and by the interlocking (not shown in FIG. 1) between the inside surface 8 of the sleeve 1 and the outside surface 5 of the connecting member 2. There is also a positive connection between the wire rope 3 and the connecting member 2, because the connecting member 2 has been pressed into the irregularities in the surface of the wire rope.

The material of the connecting member 2 is softer than that of the outside strands of the wire rope 3. For this reason, when the sleeve 1 and the connecting member 2 are pressed onto the wire rope 3, the wire rope 3 is not subjected to as much mechanical load as that which occurs in the case of the known force transmission units, in which the steel sleeve is pressed directly onto the rope. This helps to prevent damage such as the notching of the individual wires and thus the possible breakage of the wire rope 3. The service life of the force transmission unit 10 is therefore longer than that of the known force transmission units.

Figure 2A:
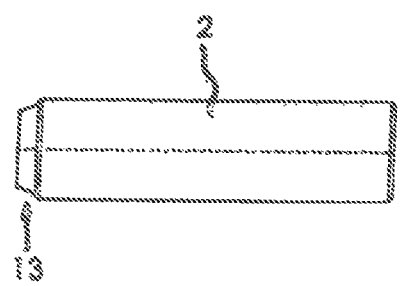
FIGS. 2a-2c shows various views of a means for producing the force transmission unit according to the invention.
Figure 2B:
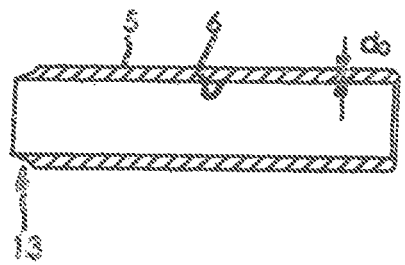
Figure 2C:
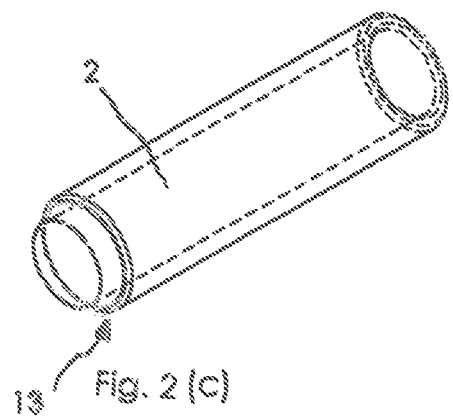

For the production of the force transmission unit 10, the connecting member 2, various views of which are shown in greater detail in FIGS. 2a-2c, is first pushed onto the wire rope 3. For this purpose, the connecting member 2 comprises an inside diameter such that it can be pushed onto the wire rope 3 loosely with a small amount of play. As is especially clear from FIG. 2b, the connecting member 2 has a bevel 13 at one end, where the wall thickness $d_0$ of the connecting member 2 decreases toward the end. The connecting member 2 is now pressed onto the wire rope 3, so that the material of the connecting member 2 is pressed into the irregularities formed in the wire rope surface by the outside strands of the wire rope 3, and a positive connection is formed. After that, the wire rope 3 is cut off at the end of the connecting member 2 opposite the end provided with the bevel 13.

Then the sleeve 1 is pushed onto the connecting member 2.

The inside diameter of the sleeve 1 is selected so that the sleeve 1 can be pushed loosely onto the connecting member 2, which has been pressed onto the wire rope 3.

The sleeve 1 is provided with a thread 9 (not shown in detail) on its inside surface 8 and comprises at one end an outward-projecting, collar-like area of increased wall thickness 11, which is formed by a circumferential projection provided on the outside surface of the sleeve. At the other end, the sleeve 1 is closed off in a cup-like manner and provided with an eyelet 12, by means of which the force transmission unit 10 can be connected to an object.

To produce the force transmission device 10 according to the invention, a pressing tool is placed on the sleeve 1, and the sleeve is pressed in such a way that it comprises a uniform outside diameter, aside from any irregularity remaining in the area of increased wall thickness 11. In particular, the area of increased wall thickness of the sleeve 1 is deformed to a greater degree than the remaining area of the sleeve 1. The remaining free area of the connecting member 2 formed by the bevel 1 is filled by the material of the sleeve, which flows into it. As a result, the structure shown in FIG. 1 is obtained. The wall thicknesses of the sleeve 1 and of the connecting member 2 are reduced from their wall thicknesses $D_0$ and $d_0$ to $D_1$ and $d_1$, respectively.

When the sleeve 1 is pressed, the thread structure 9 on the inside surface 8 of the sleeve is pressed into the outside surface 5 of the connecting member 2, and the material of the sleeve 1 and of the connecting member 2 become interlocked.

Figure 3A:
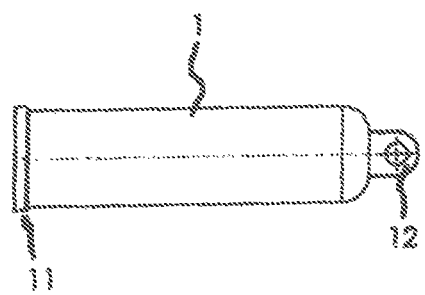
FIGS. 3a-3c shows various views of another means for producing the force transmission unit according to the invention.
Figure 3B:
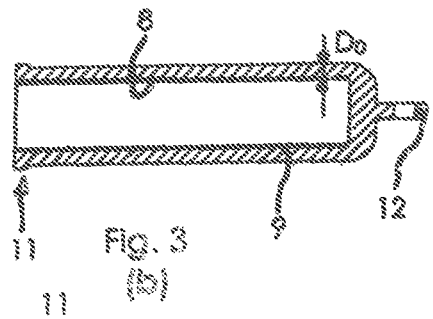
Figure 3C:
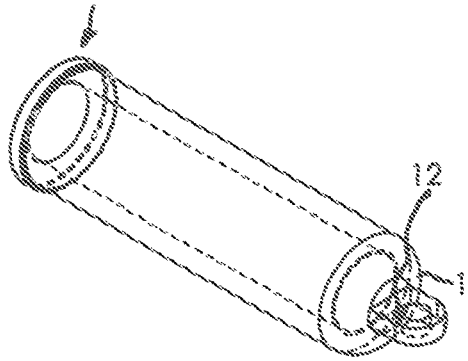
Figure 4:
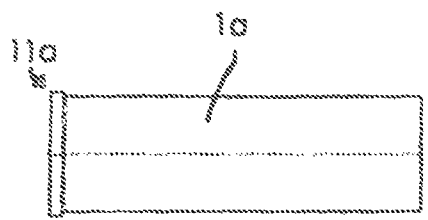
FIGS. 4a-4c shows various views of another means for producing the force transmission unit according to the invention.
Figure 4:
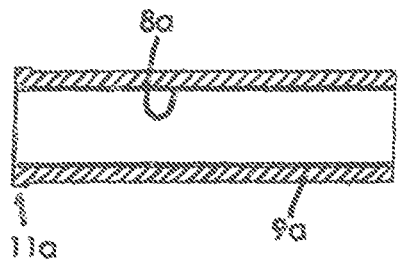
Figure 4:
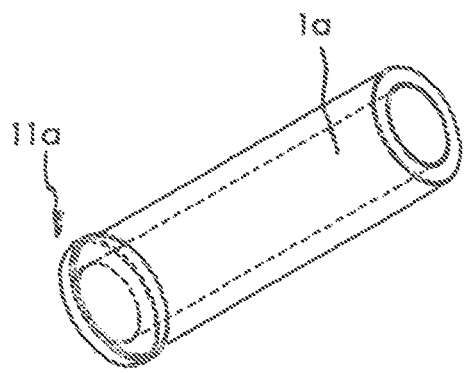

Alternatively, the force transmission device 10 can be produced by the use of the sleeve 1*a* shown in FIG. 4*a*, which, in contrast to the sleeve according to FIG. 3*a*, is open at both ends.

In another exemplary embodiment, not shown here, a sleeve is open at both ends and is provided at both ends with the above-described collar-like areas of increased wall thickness. A force transmission device obtainable by means of this sleeve and a connecting member adapted appropriately to it can be used in particular to connect the ends of two ropes together. For this purpose, the ends of the ropes are inserted into the connecting member, and then the connecting member and the sleeve, possibly simultaneously, are attached to the ends of the ropes. It is obvious that the connecting member provided for this purpose can be equipped with a bevel at each end, as described above.

In another exemplary embodiment, the force transmission device 10 can also be produced by pressing the sleeve 1, 1*a* and the connecting member 2 simultaneously onto the wire rope 3. The positive connection between the wire rope 3, the connecting member 2, and the sleeve 1, 1*a* will then be achieved in a single processing step. Simultaneously, the inside surface 6 of the connecting member 2 is pressed against the outside strands of the wire rope 3 and the inside surface 8 of the sleeve 1 is pressed into the outside of the connecting member 2. In this way, a positive connection is achieved both between the sleeve 1 and the connecting member 2 and between the connecting member 2 and the wire rope 3.

The invention claimed is:

1. A force transmission unit, comprising: a rope; and a device for introducing a force into the rope, the device comprising a sleeve that surrounds an end region of the rope and is connected to the rope by deformation, and a connecting member arranged between the sleeve and the rope, the connecting member being of a material of lower strength than that of materials out of which the sleeve and outer surface of the rope are made, wherein the sleeve has an increased wall thickness at an end at which the connecting member is inserted into the sleeve, the increased wall thickness being formed by a projection on an outer side of the sleeve, and grips the connecting member.

2. The force transmission unit according to claim 1, wherein the sleeve completely jackets the connecting member.

3. The force transmission unit according to claim 1, wherein, at least at one end, an inside surface of the sleeve surrounding the rope rests against the rope.

4. The force transmission unit according to claim 1, wherein, only in an end section of the force-introducing device, the connecting member has a wall thickness that decreases toward one end of the force-introducing device, and the sleeve has a wall thickness that increases toward the one end to compensate for the decreasing wall thickness of the connecting member.

5. An assembly for producing a force introducing device for a rope, comprising: a sleeve configured to surround an end region of the rope and which is connectable to the rope by deformation; and a connecting member that is placeable on the rope and into the sleeve, the connecting member being of a material of lower strength than that of materials out of which the sleeve and an outside surface of the rope are made, wherein the sleeve has, at an end in which the connecting member is insertable, an increased wall thickness, before deformation, formed by a projection on an outer side of the sleeve.

6. The assembly according to claim 5, wherein the sleeve and/or the connecting member comprises a hollow cylindrical shape, wherein the sleeve comprises a shape such that, after deformation, the sleeve completely jackets and grips an outside of the connecting member.

7. The assembly according to claim 5, wherein the connecting member has a reduced wall thickness at at least one end.

8. The assembly according to claim 5, wherein a bevel is formed on an outside surface and/or an inside surface of the connecting member at one end.

9. The assembly according to claim 5, wherein a collar is formed at the at least one end of the sleeve.

10. The assembly according to claim 5, wherein the sleeve and the connecting member are adapted to each other with respect to shapes so that, after deformation, an inside surface of the sleeve rests against the rope at least at one end.

11. The assembly according to claim 10, wherein the sleeve and the connecting member are adapted to each other with respect to wall thickness, size, and length.

12. A method for producing a force transmission unit, comprising the steps of: providing a rope, and a device for introducing forces into the rope; mounting a sleeve of the force introducing device on an end region of the rope so that the sleeve surrounds the rope; arranging a connecting member of the force introducing device between the sleeve and the rope, which member is made of material of lower strength than that of materials out of which the sleeve and outer strands of the rope are made; and deforming the sleeve to connect the sleeve and connecting member to the rope, wherein the sleeve as an increased wall thickness at an end at which the connecting member is inserted, the increased wall thickness being formed by a projection on an outer side of the sleeve, the sleeve being deformed more at the end with the increased wall thickness than in a remainder of the sleeve so that after deformation the sleeve grips the connecting member.

13. The method according to claim 12, wherein the sleeve, the connecting member, and the rope are connected to each other so that a wall thickness of the connecting member decreases toward one end of the force-introducing device formed by the connecting member and the sleeve, and a wall thickness of the sleeve increases toward the one end.

14. The method according to claim 12, including mounting the sleeve on the connecting member and the rope so that an inside surface of the sleeve surrounding the rope rests on the rope.

15. The method according to claim 12, including mounting the sleeve on the connecting member and the rope so that the sleeve completely jackets the connecting member.

16. The method according to claim 12, wherein the sleeve and/or the connecting member is pressed, hammered, and/or rolled onto the rope.

* * * * *